(12) United States Patent
Wu et al.

(10) Patent No.: US 6,341,187 B1
(45) Date of Patent: Jan. 22, 2002

(54) AUTOMATIC LIGHT-COUPLING SYSTEM FOR OPTICAL COMPONENTS

(75) Inventors: Cherng-Shiun Wu, Taichung; Ei-Kwei Li, Kaohsiung; Chun-Mei Wu, Changhua Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/502,160

(22) Filed: Feb. 11, 2000

(30) Foreign Application Priority Data

Jun. 15, 1999 (TW) ........................ 88109979 A

(51) Int. Cl.$^7$ .............................. G02B 6/26; G02B 6/42
(52) U.S. Cl. ...................... 385/52; 385/134; 356/153; 356/399; 356/400
(58) Field of Search ................................ 385/134, 139, 385/52, 15; 356/399, 400, 138, 153

(56) References Cited

U.S. PATENT DOCUMENTS

| | | | |
|---|---|---|---|
| 3,800,388 A | * | 4/1974 | Borner ..................... 385/134 |
| 4,506,947 A | * | 3/1985 | Tatekura .................. 385/139 |
| 4,798,442 A | * | 1/1989 | Feilhauer ................. 385/52 |
| 5,383,118 A | * | 1/1995 | Nguyen ................... 356/400 |

OTHER PUBLICATIONS

DeCusatis et al., "Handbook of Fiber Optic Data Communication", 1988, Academic Press, pp. 652–655.*

* cited by examiner

Primary Examiner—Darren Schuberg
Assistant Examiner—Leo Boutsikaris
(74) Attorney, Agent, or Firm—Beyer Weaver & Thomas, LLP

(57) ABSTRACT

An automatic light-coupling system for optical components suitable for coupling and packaging an optical assembly, comprising: a light-coupling device comprising: a coupling media installer comprising a horizontal table for moving a coupling media along a horizontal direction; a vertical table for moving a coupling media along a vertical direction; and a coupling media table for clipping a connector of the coupling media; and an optical component installer comprising a focus-control table for controlling the focusing and withdrawing of the optical components; a horizontal turntable for controlling the horizontal rotation of the optical components; a vertical turntable for controlling the vertical rotation of the optical components; an adapter of the optical component for holding the optical component, in which a pinhole is placed in front of the optical component so that the light emitted from the optical component passes through the pinhole and forms a light beam that is rotated to correct the assembly inclination of the horizontal table and the vertical table and confirms the position of the rotation axis on the Cartesian coordinates; and a withdrawing component for separating the connector from the adapter after the coupling and packaging of the optical component and the coupling media are finished; and a coupling control device for control the automatic light-coupling process of the light-coupling device.

10 Claims, 7 Drawing Sheets

AUTOMATIC LIGHT-COUPLING SYSTEM FOR OPTICAL COMPONENTS

BACKGROUND OF THE INVENTION

1. Field of the invention

This invention relates to an optical system, and more particularly to an automatic light-coupling system for optical components.

2. Description of prior art

In the prior arts, an active optical component is normally used to direct an optical signal into a fiber or extract a signal through the light output from a fiber. The light-coupling process is important but difficult to apply in opto-electronic systems since the diameter of the core of a fiber is only several ten micrometers to several micrometers. Light-coupling technology includes flip chip bonding technology and automatic light-coupling technology.

In the automatic light-coupling technology, a light-emitting component emits a light beam that is coupled into a light-guiding component. A light-receiving component monitors the coupling condition and corrects the light-coupling efficiency. The light coupling can be manually adjusted or automatically adjusted. However, most of the light-coupling adjustment is automatic due to economic considerations. As disclosed in "Handbook of Fiber Optic Data Communication," Section 5.3, Chapter 18, Academic Press, 1988, automatic light-coupling technology normally adjusts the coupling efficiency by moving the five axes X, Y, Z, $\theta_x$ and $\theta_y$ in space to optimize the coupling effect. However, it is very difficult to find the optimized coupling position since the five axes are moved independently but affect each other.

The optimized light-coupling way presently utilized is to adjust the X-axis, Y-axis and Z-axis independently, and find the best light-coupling point on the XY-plane for each fixed Z-axis. Referring to FIG. 1, a box scan is first performed on XY-plane, then a line scan is performed if a light spot is found to find the position having a maximum intensity. However, the optimized light-coupling position is very difficult to find if the optical axis is inclined.

The common method to couple an optical component with a fiber adapter uses a 3-dimensional movable table to adjust the coupling position and the focus condition, but this doesn't solve the problem of inclination.

SUMMARY OF THE INVENTION

Accordingly, to overcome the prior-art problems, the object of this invention is to provide an automatic light-coupling system for optical components to improve the light-coupling efficiency of a fiber adapter and a To-Can type of light source.

The automatic light-coupling system of this invention can lower the effect of an inclined optical axis, increase the coupling efficiency, and reduce the coupling time and the mass-production cost.

To achieve the above object, this invention locates the optical axis at the initial position of the coupling media by rotating a horizontal turntable and a turntable of optical components. Further, the optical axis is parallel to the line that a focus-control movable table moves along. Therefore, an optimized coupling position can be obtained by moving the focus-control movable table horizontally.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
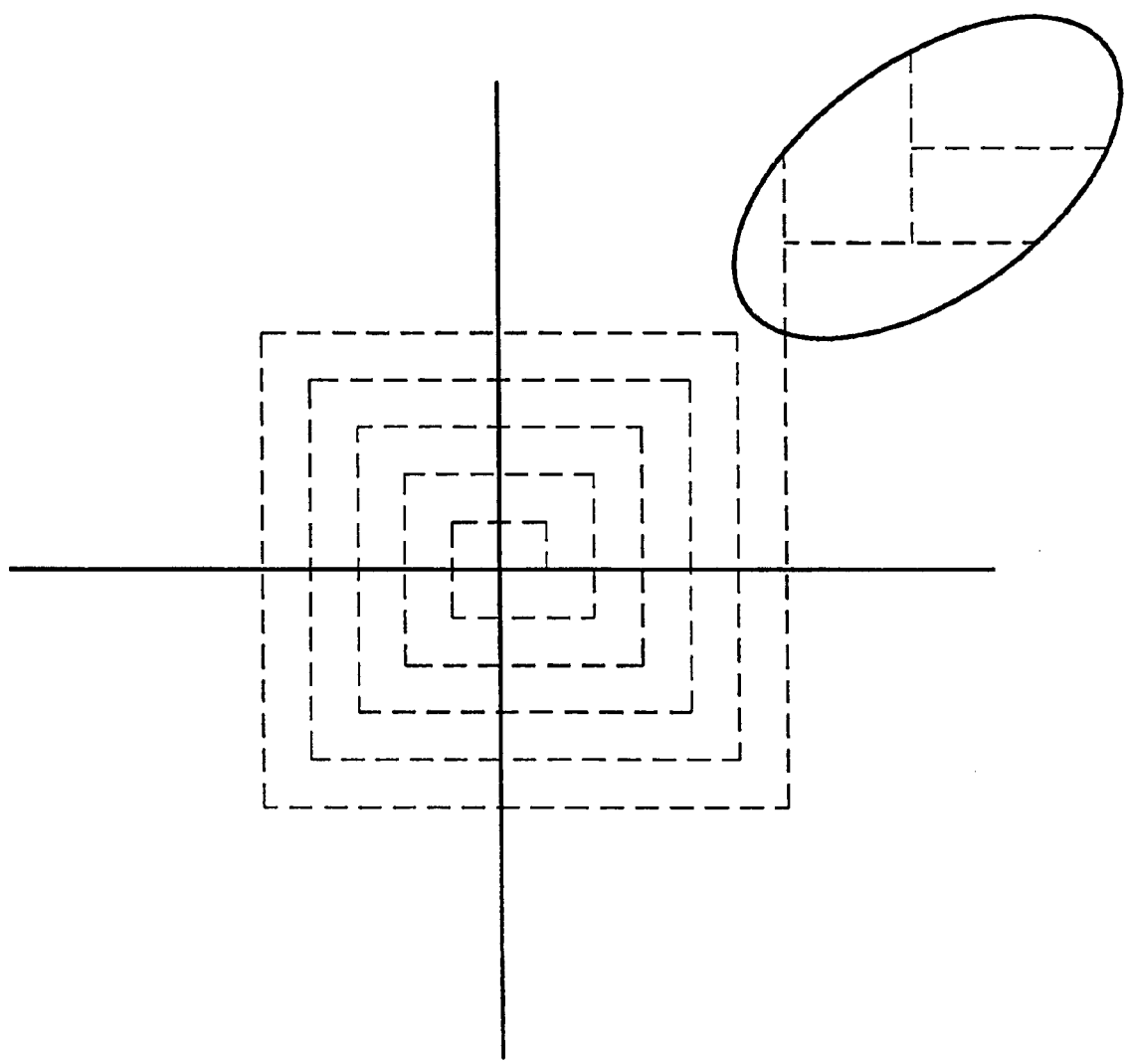
FIG. 1 is a diagram illustrating a conventional light-coupling method.
Figure 2:
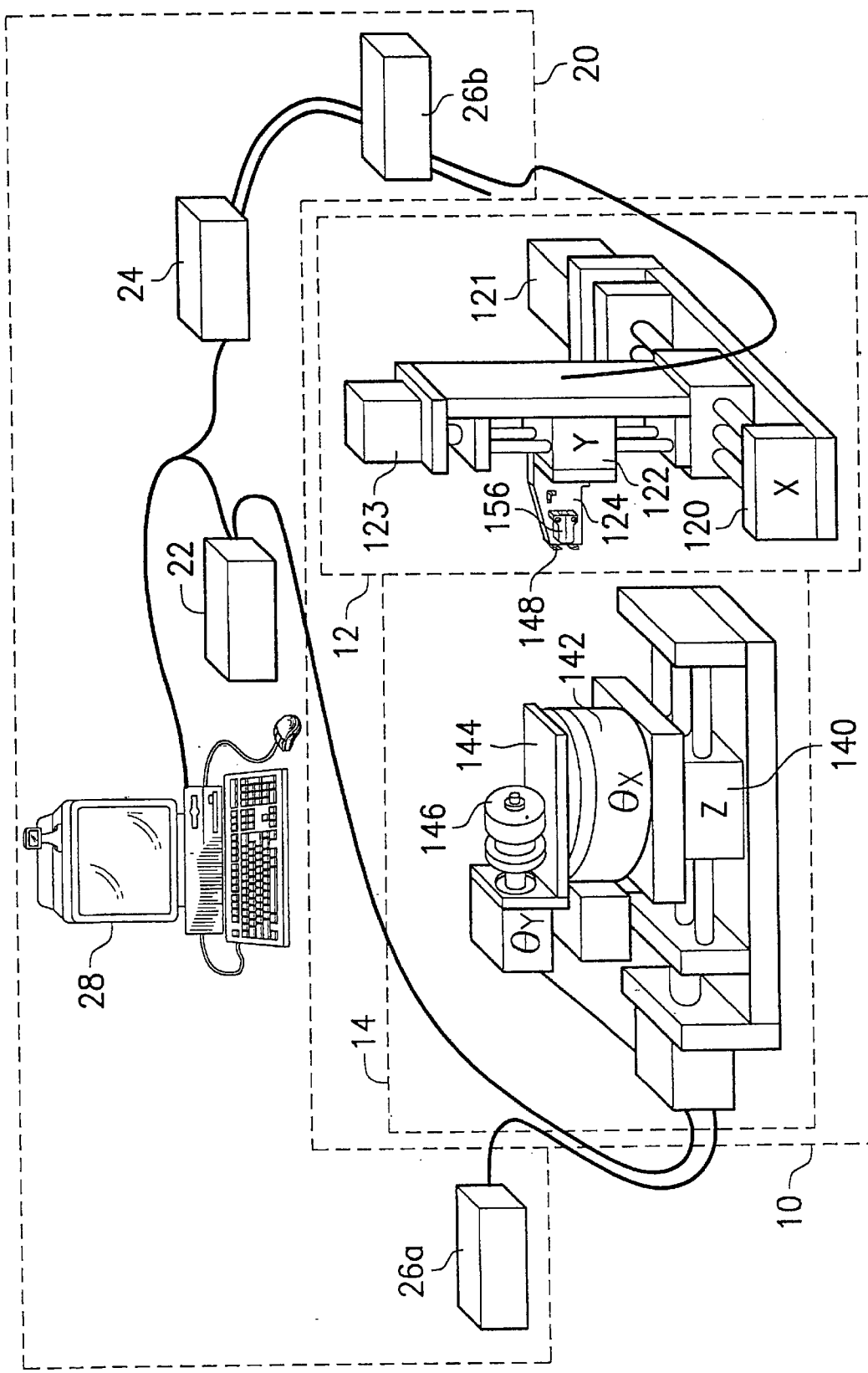
FIG. 2 is a diagram illustrating the structure of the automatic light-coupling system according to one embodiment of this invention.

Referring to FIG. 2, the automatic light-coupling system of this invention comprises a light-coupling device 10 and a coupling control device 20. The light-coupling device 10 includes a coupling media installer 12 and an optical component installer 14.

The coupling media installer 12 comprises: a coupling horizontal table 120, which is a linearly movable table controlled by a step motor or servo-motor 121, for controlling the movement of the coupling media along the horizontal direction; a coupling vertical table 122, which is a linearly movable table controlled by a step motor or servo-motor 123, for controlling the movement of the coupling media along the vertical direction; and a coupling media table 124 for holding the coupling media. The optical component installer 14 comprises a focus-control table, which is a linearly movable table controlled by a step motor or servo-motor, for controlling the focusing and the withdrawing of the optical component; a horizontal turntable 142 for controlling the horizontal rotation of the optical component; a vertical turntable 144 for controlling the vertical rotation of the optical component, in which the vertical rotation angle of the optical component equals the rotation angle of a step motor; an adapter 146 of the optical component for holding an optical component and a power supply, in which a pinhole is formed in front of the optical component so that the light emitted from the optical component passes through the pinhole and forms a light beam, which is rotated to correct the assembly inclination of the coupling horizontal table 120 and the coupling vertical table 122 of the coupling media installer 12 and to determine the Cartesian coordinates for the rotation axis; and a withdrawing component 148 for separating the connector 152, such as an SC receptacle, from the coupling media after coupling and packaging the optical component and the coupling media.

The coupling control device 20 comprises: a voltage/current supply 22 for providing a proper current and voltage to allow the optical component. to emit a light; a photo-detector 24 for receiving the light emitted by the optical component through the coupling media and determining the light intensity; motor drivers 26a, 26b for driving the linear movement of the focus-control table 140, the coupling horizontal table 120 and the coupling vertical table 122 and the rotation of the horizontal turntable 142 and the vertical turntable 144; and an auto-control processor 28 for controlling the voltage/current supply 22, the photo-detector 24, the motor drivers 26a, 26b.

The motor drivers 26a, 26b are controlled according to the light intensity detected by the photo-detector 24 to change the relative position of the optical component and the coupling media so as to find the coupling position.

Figure 3A:
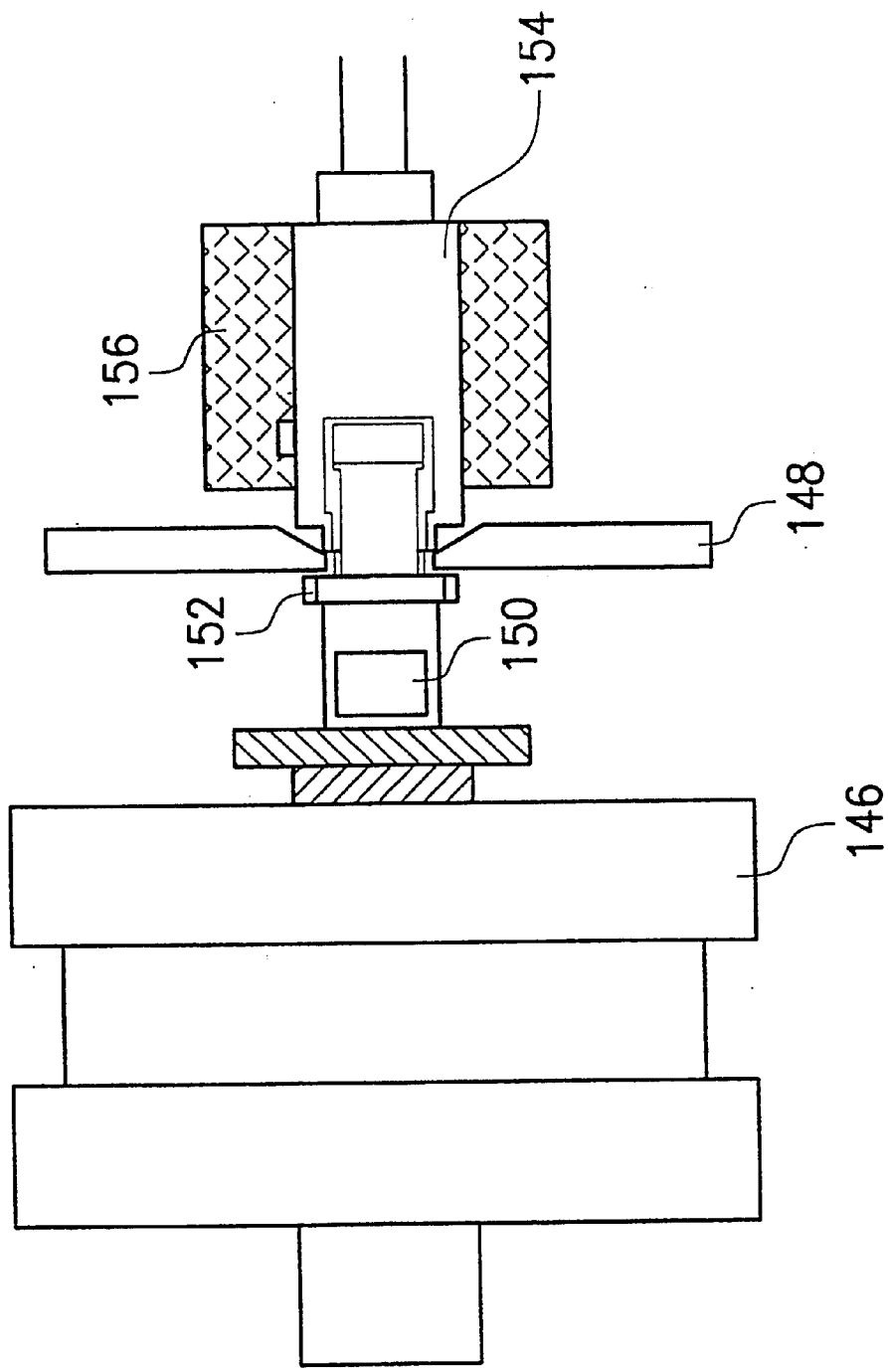
FIGS. 3a and 3b show the light-coupling mechanism for the automatic light-coupling system of this invention.
Figure 3B:
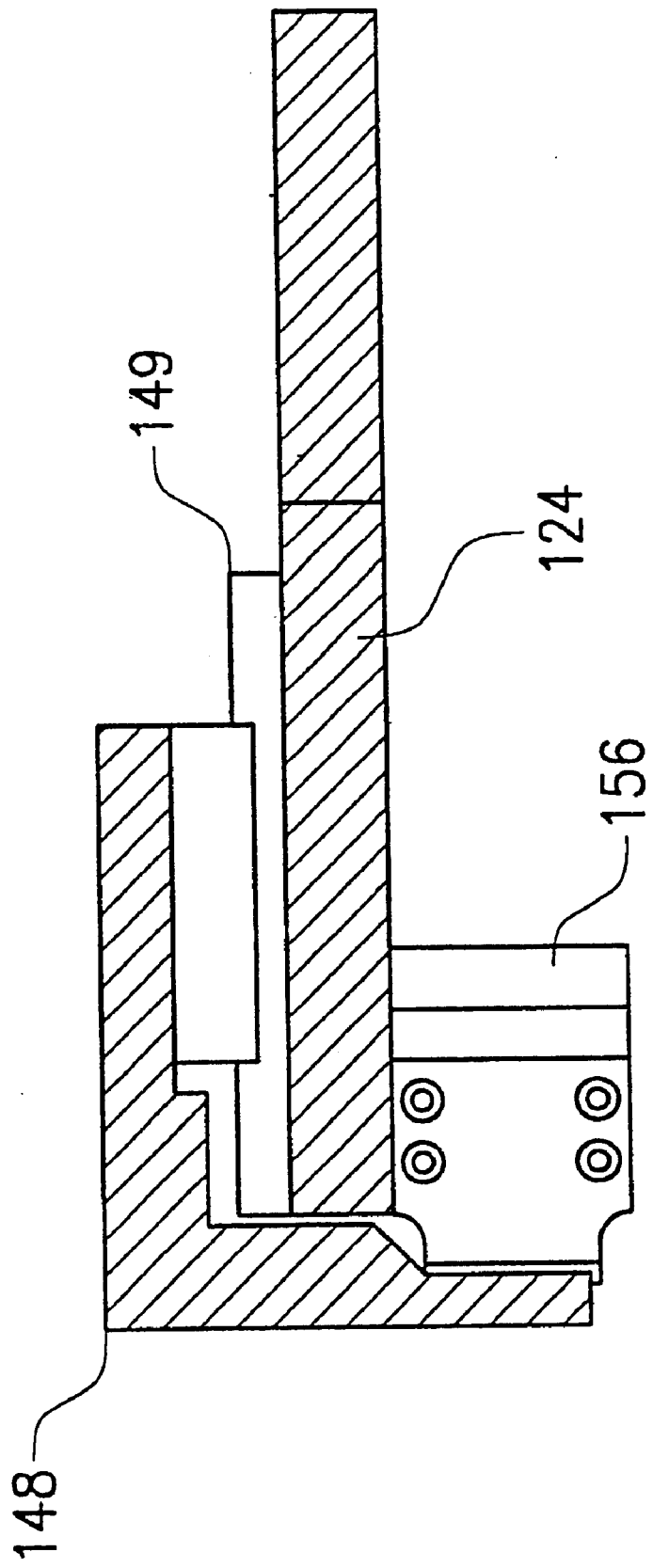

Referring to FIG. 3a, while coupling the optical component with the coupling media which is held by the coupling media holder, the light source 150 and the connector 152 are placed in the adapter 146 and the receptacle 154 respectively. The light source 150 and the connector 152 are fixed after the coupling process is finished. Then, the receptacle 154 is withdrawn by using a U-type separating device to fixedly clip the connector 152 so that the connector 152 can be separated from the receptacle 154. Referring to FIG. 3b, the U-type separating device 148 is disposed on a linear rail 149. As the coupling and the packaging are finished, the U-type separating device 148 can move along the rail 149 so that the two arms of the U-type separating device are fit to the depressed portion between the connector and the receptacle. Thus, the connector can be fixed with the light source while the receptacle is moved away.

Figure 4:
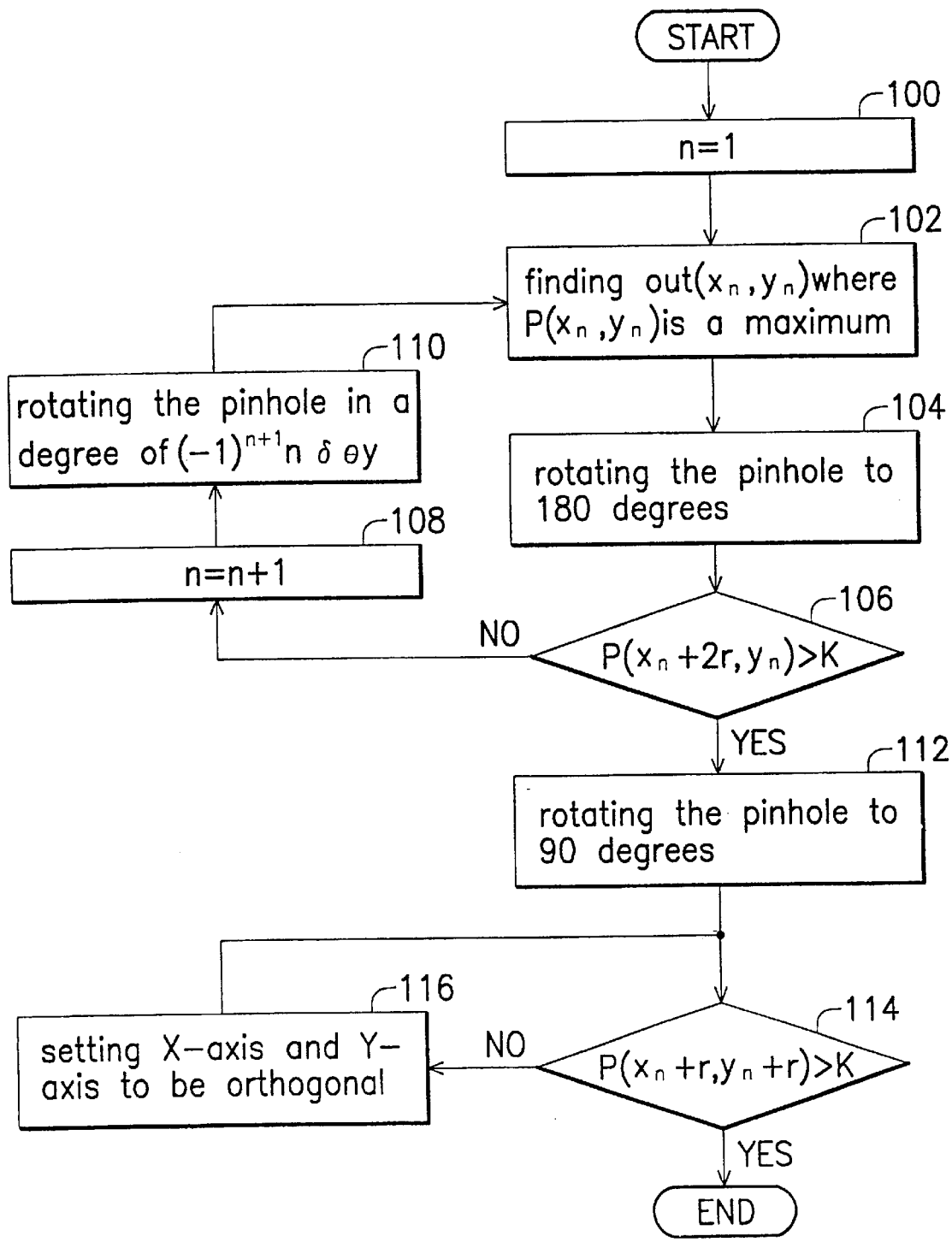
FIG. 4 is a flow diagram illustrating the automatic control of the automatic light-coupling system of this invention.

Referring to FIG. 4, the control process of the automatic light-coupling system of this invention comprises the steps of: (i) step 100, setting the initial position of the pinhole to be the first point, that is n=1; (ii) step 102, finding out the coordinates $(x_n, y_n)$ of the pinhole where the brightness $P(x_n, y_n)$ is a maximum; (iii) step 104, rotating the pinhole to 180 degrees; (iv) step 106, determining whether the brightness $P(X_{n+2r}, y_n)$ is larger than a certain value K, go to the next step if no, otherwise go to step 112; (v) step 108, setting the position of the pinhole to be the next point, that is n=n+1; (vi) step 110, rotating the pinhole in a degree of $(-1)^{n+1}n\delta\theta_y$, then go back to step 102; (vii) step 112, rotating the pinhole to 90 degrees; (viii) step 114, determining whether the brightness $P(X_{n+r}, y_{n+r})$ is larger than the value K, go to the next step if no, otherwise end the control process; (ix) step 116, setting the X-axis and the Y-axis to be orthogonal, then go back to step 114.

In the above process, the X-axis is corrected and the center of the rotating axis $\theta_y$ is determined from step 102 through step 110. The Y-axis is corrected from step 112 through step 116. After the X-axis and the Y-axis have been corrected, it is easy to move the optical component along the Z-axis to couple the light emitted by the optical component into the coupling media.

Figure 5A:
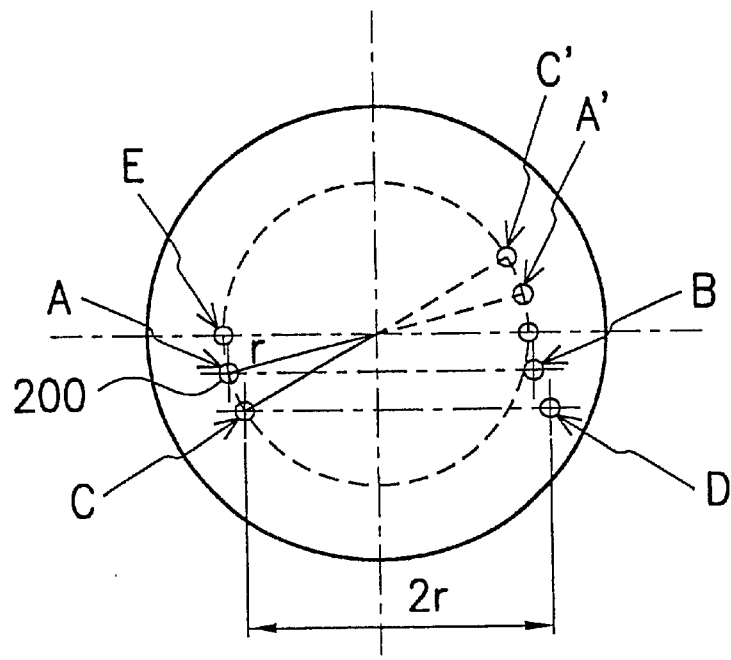
FIGS. 5a and 5b a diagrams illustrating the light-coupling process for the automatic light-coupling system of this invention.
Figure 5B:
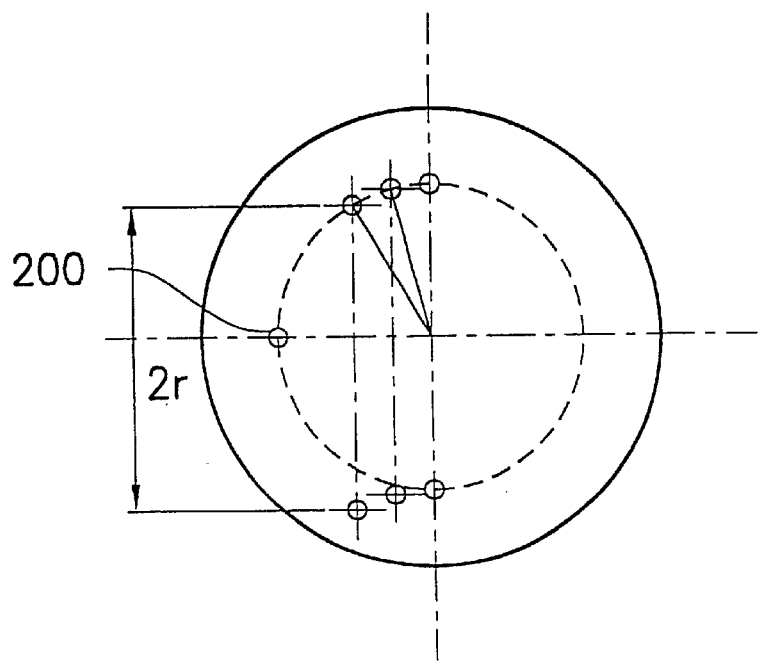
Figure 6:
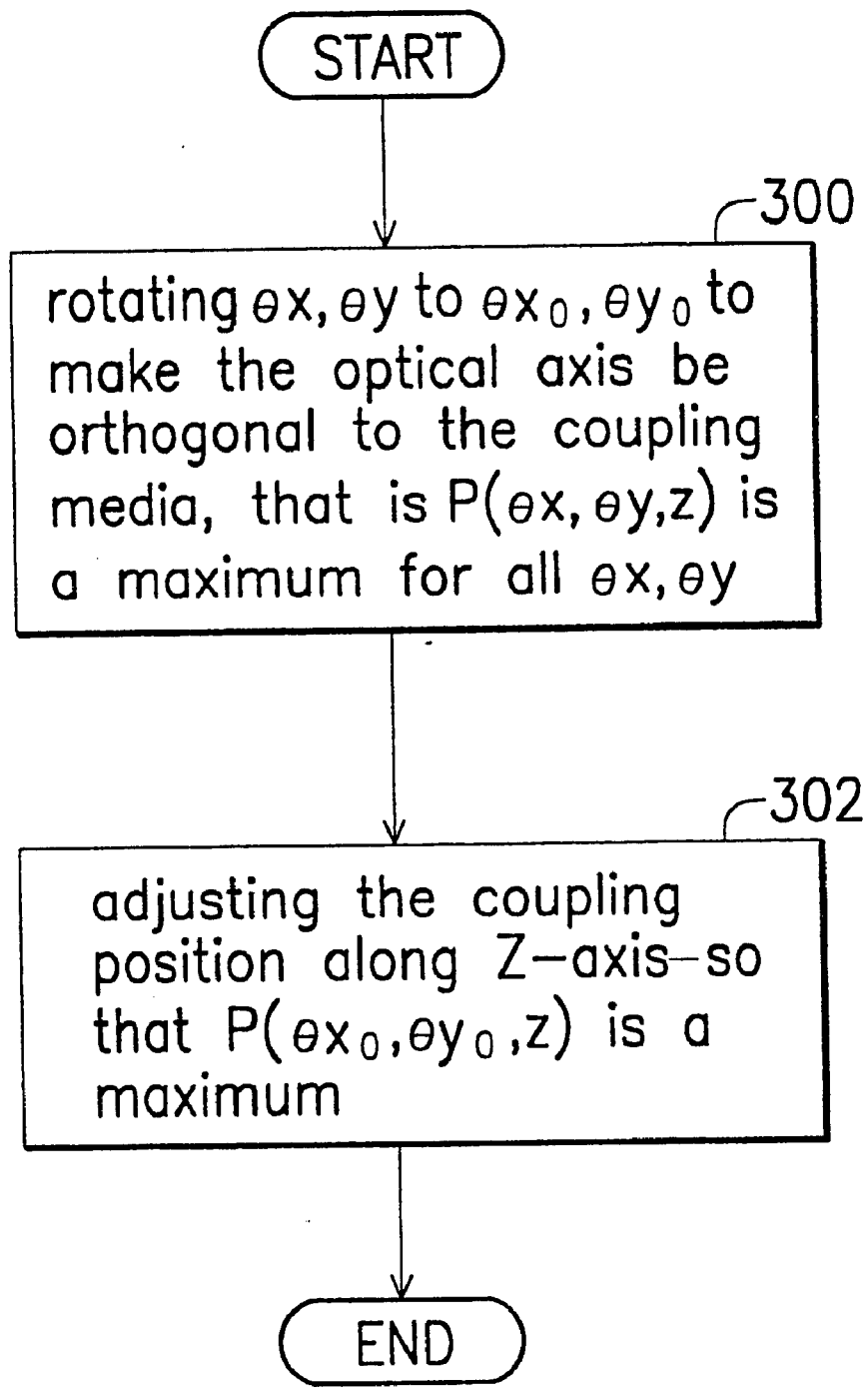
FIG. 6 is a low diagram illustrating the light-coupling process for the automatic light-coupling system of this invention.

Furthermore, referring to FIGS. 5a and 5b, the automatic light-coupling system of this invention corrects the horizontal direction and the vertical direction for the optical component in a correction step. That is, a pinhole is set in front of the optical component, so that the light emitted by the optical component passes through the pinhole to form a light beam. The pinhole is rotated to correct the assembly inclination of the coupling horizontal table and the coupling vertical table of the coupling media table and to determine the Cartesian coordinates for the rotating axis. As shown in FIG. 5a, the pinhole 200 is located on the circle having a radius of r. When performing the horizontal correction, the coupling horizontal table and the coupling vertical table are moved to look for the position (point A) of the pinhole, that is, the position $(X_A, Y_A)$ is a position where the coupling power is a maximum. Then, the pinhole is rotated 180 degrees to point A', and the coupling media moves a distance of 2r along the X-axis to point B. If the light passing through the pinhole can be detected, the coupling power is adjusted to be a maximum. The position of the coupling media becomes $(X_B, Y_B)$ at this time. By making an optimization analysis for the positions $(X_A, Y_A)$ and $(X_B, Y_B)$, the position of the rotating center is corrected. If the light passing through the pinhole can not be detected, the pinhole rotates to point C, and the coupling media moves to the position $(X_C, Y_C)$ to detect the coupling position having a maximum power. The pinhole is then rotated 180 degrees to point C'. The coupling media moves a distance of 2r along the X-axis to point D to repeat the detection. Since the distance between the positions of the pinhole before and after rotating is 2r, the pinhole before and after rotating can not be detected unless the rotating center (i.e., the center of optical component) is on the horizontal axis of the coupling media. Similarly, as shown in FIG. 5b, the same process can be used to correct the center of optical component to locate on the vertical axis of the coupling media. Once the center of optical component is aligned with the center of the coupling media, the coupling can be accomplished by adjusting the position of the optical component on Z-axis.

Reference to FIG. 5, the coupling process for the automatic light-coupling system for optical components of this invention comprises the steps of: (i) step 300, rotating the rotating axis $\theta_x$, $\theta_y$ to $\theta_{x0}$, $\theta_{y0}$ to make the optical axis be orthogonal to the coupling media, that is the brightness $P(\theta_x, \theta_Y, z)$ is a maximum for all $\theta_X$, $\theta_Y$; (ii) step 302, finding out the optimal coupling position along the Z-axis so that the brightness $P(\theta_{x0}, \theta_{y0}, Z)$ is a maximum for all z.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An automatic light-coupling system for optical components, which is suitable for coupling and packaging an optical assembly, comprising:

a light-coupling device comprising:

a coupling media installer comprising: a horizontal table for moving a coupling media along a horizontal direction; a vertical table for moving a coupling media along a vertical direction; and a coupling media table for clipping a connector of the coupling media; and an optical component installer comprising: a focus-control table for controlling the focusing and withdrawing of the optical components; a horizontal turntable for controlling the horizontal rotation of the optical components; a vertical turntable for controlling the vertical rotation of the optical components; an adapter of the optical component for holding the optical component, in which a pinhole is placed in front of the optical component so that the light emitted from the optical component passes through the pinhole and forms a light beam that is rotated to correct the assembly inclination of the horizontal table and the vertical table; and a withdrawing component for separating the connector from the adapter after the coupling and packaging of the optical component and the coupling media are finished; and a coupling control device for controlling the automatic light-coupling process of the light-coupling device.

2. The automatic light-coupling system as claimed in claim 1 wherein the coupling control device comprises:

a voltage/current supply for providing a proper voltage and current to the optical component to emit a light;

a photo-detector for receiving the light emitted by the optical component and detecting the light intensity;

a driver for driving the linear movement of the focus control table, the horizontal table, the vertical table and the rotation of the horizontal turntable and the vertical turntable; and an auto-control processor controlling the voltage/current supply, the photo-detector and the driver, which is controlled according to the light intensity detected by the photo-detector to change the relative position of the optical component and the coupling media so as to find the optimal coupling position.

3. The automatic light-coupling system as claimed in claim 1 wherein a light source is placed in the adapter of the optical component so that the light emitted from the light source passes through the pinhole on the adapter.

4. The automatic light-coupling system as claimed in claim 1 wherein the pinhole on the adapter of the optical component is used to locate the position of the rotation axis.

5. The automatic light-coupling system as claimed in claim 1 wherein the coupling media table comprises a U-type separating device, a linear rail and a coupling media holder.

6. The automatic light-coupling system as claimed in claim 1 wherein the horizontal table for moving the coupling media along the horizontal direction is linearly movable table.

7. The automatic light-coupling system as claimed in claim 1 wherein the vertical table for moving the coupling media along the vertical direction is linearly movable table.

8. The automatic light-coupling system as claimed in claim 1 wherein the focus-control table is a linearly movable table.

9. The automatic light-coupling system as claimed in claim 1 wherein the vertical turntable is rotating driven by a step motor, and the rotating angle of the step motor is the vertical rotating angle of the optical component.

10. The automatic light-coupling system as claimed in claim 2 wherein the driver is a step motor or a servomotor.

* * * * *